(12) United States Patent
Slotman (10) Patent No.: US 10,202,851 B2
(45) Date of Patent: Feb. 12, 2019

(54) ROTOR FOR A RADIAL COMPRESSOR AND A METHOD FOR CONSTRUCTION THEREOF

(71) Applicant: SIEMENS AKTIENGESELLSCHAFT, München (DE)

(72) Inventor: Jan Slotman, Haaksbergen (NL)

(73) Assignee: SIEMENS NEDERLAND N. V. (NL)

( * ) Notice: Subject to any disclaimer, the term of this patent is extended or adjusted under 35 U.S.C. 154(b) by 484 days.

(21) Appl. No.: 14/410,124

(22) PCT Filed: Jul. 18, 2013

(86) PCT No.: PCT/EP2013/065190
§ 371 (c)(1),
(2) Date: Dec. 22, 2014

(87) PCT Pub. No.: WO2014/013020
PCT Pub. Date: Jan. 23, 2014

(65) Prior Publication Data
US 2015/0322961 A1    Nov. 12, 2015

(30) Foreign Application Priority Data

Jul. 18, 2012    (EP) .................................... 12176876

(51) Int. Cl.
*F01D 5/06*    (2006.01)
*F04D 17/12*    (2006.01)
(Continued)

(52) U.S. Cl.
CPC ............. *F01D 5/066* (2013.01); *F01D 5/026* (2013.01); *F04D 17/12* (2013.01); *F04D 17/122* (2013.01);
(Continued)

(58) Field of Classification Search
CPC ........ F01D 5/066; F01D 5/026; F04D 29/624; F04D 29/4206; F04D 29/053;
(Continued)

(56) References Cited

U.S. PATENT DOCUMENTS 2,405,284 A * 8/1946 Birmann ............... F04D 17/122
                                                                  415/134
2,672,013 A * 3/1954 Lundquist ............... F01D 9/065
                                                                  415/115
(Continued)

FOREIGN PATENT DOCUMENTS

CN          102235373 A    11/2011
EP           2381109 A2    10/2011
(Continued)

OTHER PUBLICATIONS

International Search Report, PCT/EP2013/065190; International Filing Date: Jul. 18, 2013; 4 pgs.
(Continued)

*Primary Examiner* — Richard A Edgar
*Assistant Examiner* — Danielle M. Christensen
(74) *Attorney, Agent, or Firm* — Schmeiser, Olsen & Watts LLP (57) ABSTRACT

A rotor for a radial compressor is provided. An axial shaft of the radial compressor includes longitudinal axial shaft segments. The rotor includes rotor discs, which are placed adjacent to one another, and which extend along a longitudinal axis of the radial compressor. The rotor discs include the respective axial shaft segments and impellers. A coupling means is provided to couple the rotor discs with one another. The coupling means permits reversible axial splitting of the axial shaft into the respective axial shaft segments.

12 Claims, 4 Drawing Sheets

(51) Int. Cl.

| | | |
|---|---|---|
| *F04D 29/053* | (2006.01) | |
| *F04D 29/42* | (2006.01) | |
| *F04D 29/62* | (2006.01) | |
| *F04D 29/28* | (2006.01) | |
| *F01D 5/02* | (2006.01) | |
| *F16D 1/033* | (2006.01) | |
| *F04D 29/054* | (2006.01) | |

(52) U.S. Cl.
CPC ......... *F04D 29/053* (2013.01); *F04D 29/054* (2013.01); *F04D 29/286* (2013.01); *F04D 29/4206* (2013.01); *F04D 29/624* (2013.01); *F16D 1/033* (2013.01); *F05D 2240/60* (2013.01); *Y10T 29/49323* (2015.01)

(58) Field of Classification Search
CPC ...... F04D 29/054; F04D 29/286; F04D 29/04; F04D 29/0405; F04D 29/05; F04D 29/185; F04D 29/22; F04D 17/12; F04D 17/122; F04D 13/023; F04D 19/02; F04D 1/06; F16D 1/033; F05D 2240/60
USPC ............ 415/122.1, 123, 124.2; 464/149, 157
See application file for complete search history.

(56) References Cited

U.S. PATENT DOCUMENTS

| | | | | | |
|---|---|---|---|---|---|
| 3,184,153 | A | * | 5/1965 | Zech | ............... F01D 5/04 416/198 A |
| 3,976,395 | A | * | 8/1976 | Kalnin | ............... F04D 1/063 415/172.1 |
| 4,645,419 | A | * | 2/1987 | Furuya | ............... F04D 29/444 415/208.2 |
| 4,887,940 | A | * | 12/1989 | Todoroki | ............... F01D 5/10 415/199.1 |
| 5,267,397 | A | | 12/1993 | Wilcox | |
| 5,537,814 | A | | 7/1996 | Nastuk et al. | |
| 5,628,621 | A | | 5/1997 | Toborg | |
| 2003/0017878 | A1 | | 1/2003 | Muju et al. | |
| 2011/0262284 | A1 | * | 10/2011 | Guernard | ............... F04D 17/122 416/244 A |
| 2012/0201658 | A1 | | 8/2012 | Le Brusq et al. | |

FOREIGN PATENT DOCUMENTS

| | | |
|---|---|---|
| FR | 2406121 A | 5/1979 |
| FR | 2406121 A1 | 5/1979 |
| FR | 2952138 A1 | 5/2011 |
| JP | 5106466 A | 4/1993 |
| JP | H05105406 A | 4/1993 |
| JP | 2006138255 A | 6/2006 |
| JP | 5106466 B2 | 12/2012 |

OTHER PUBLICATIONS

Chinese Office Action dated July 31, 2015; Application No. 201380038471.3; 7 Pgs.

Extended European Search Report; App No. 12176876.6; 8 pgs.

Written Opinion, PCT/EP2013/065190; International Filing Date: Jul. 18, 2013; 4 pgs.

* cited by examiner

ROTOR FOR A RADIAL COMPRESSOR AND A METHOD FOR CONSTRUCTION THEREOF

CROSS-REFERENCE TO RELATED APPLICATIONS

This application claims priority to PCT Application No. PCT/EP2013/065190 having a filing date of Jul. 18, 2013, based off of EP 12176876.6 having a filing date of Jul. 18, 2012, the entire contents of which are hereby incorporated by reference.

FIELD OF TECHNOLOGY

A rotor for a radial compressor and a method for construction thereof.

BACKGROUND

A rotor is a rotating component of a rotating machine and facilitates the conversion of torque generated by a motor of a turbomachine into useful work. The rotor comprises an axial shaft and different components mounted on the axial shaft. The axial shaft transmits the torque generated by a motor of the turbomachine. The rotor utilizes the torque in order to perform a wide range of desired applications. For example, a rotor for a compressor comprises one or more impellers mounted on the axial shaft for compressing a working fluid in order to increase the pressure and flow rate of the working fluid. Furthermore, the rotor can comprise multiple stages, for example, a rotor for a three stage compressor comprises three impellers arranged in succession, wherein each of the impellers is circumferentially disposed on the axial shaft. Such a multi stage rotor in a compressor is advantageous as the amount of work performed is enhanced manifold times, resulting in a higher compression ratio compared to a single stage compressor.

Traditionally, a rotor comprising multiple stages is constructed by assembling the aforementioned individual stages at designated locations on the axial shaft. The axial shaft is hereof a monolithic unit. The individual stages are then shrink fitted at the designated locations on the axial shaft. During this process of construction, either a casing of the rotor is kept open in order to obtain a clear view of the axial shaft or the casing of the rotor is to be provided with margin space to facilitate the assembly of the different stages on the axial shaft, and as well as for the free movement of equipments that are utilized for assembling the rotor. The margin space is then covered appropriately so that the flow profile inside the compressor remains unaffected.

The aforementioned rotor assembly is disadvantageous. In case of enormous rotors, for example a ten stage compressor, the length and weight of the axial shaft increase tremendously. This overburdens the transportation of the individual components of the motor, and also mandates more space for assembling the individual components in order to construct the rotor. Furthermore, the equipments used for facilitating the assembly require more space for its movement.

Additionally, if the axial shaft suffers an irreparable damage or a crack, the entire rotor has to be dismantled and the entire axial shaft has to be replaced for repairing the damaged axial shaft, which is a cumbersome task.

Therefore, the design and construction of the rotors of the aforementioned type is a challenging task.

SUMMARY

An aspect relates to a convenient, compact, and simple solution for rotor construction and assembly for an efficient and hassle free handling of the rotor for the radial compressor.

An aspect further relates to the construction of a rotor for a radial compressor by simplifying the design and increasing the compactness of the rotor. This is achieved by a rotor for a radial compressor according to embodiments of the present invention, wherein the rotor comprises an axial shaft. The rotor and the axial shaft extend along a longitudinal axis of the radial compressor. The axial shaft comprises a first axial shaft segment and a second axial shaft segments. The axial shaft segments are longitudinal segments of the axial shaft. The rotor comprises a first rotor disc and a second rotor disc. The first rotor disc comprises a first axial shaft segment and a first impeller, whereas the second rotor disc comprises a second axial shaft segment and a second impeller. The rotor discs are located adjacent to one another, and are also coupled to one another by a coupling means. The coupling means permits reversible axial splitting of the axial shaft into the first axial shaft segment and the second axial shaft segment.

Herewith, it is possible to build massive multi-stage compressors by simple stage-wise assembly of various impellers and the respective axial shaft segments that constitute the rotor. Furthermore, it reduces the space required for transporting and/or storage of the various components.

According to another embodiment of the present invention, the coupling means is a Hirth joint. In a preferred embodiment, the Hirth joint comprises a first set of longitudinally extending serrations provided on the first axial shaft segment and a second set of longitudinally extending serrations provided on the second axial shaft segment. The sets of longitudinally extending serrations positively engage with one another to couple the rotor discs to one another. Hirth joints are efficient means for transmission of torque through an axial shaft formed by integration of individual axial shaft segments. Furthermore, a positively engaging coupling is a robust means that is capable of withstanding mechanical shocks encountered during the operation of the radial compressor.

According to yet another embodiment of the present invention, the rotor comprises a fastening means. The fastening means fastens the first rotor disc to the second rotor disc. In a preferred embodiment, the fastening means is a tie bolt. The tie bolt is inserted through a first hole provided in the first rotor disc and a second hole provided in the second rotor disc. Subsequently, the tie bolt is tightened for fastening the first rotor disc and the second rotor disc. Tie bolts are beneficial, because it reduces the margin space required for the tools required for fastening the rotor discs to one another. Furthermore, the tie bolts possess the capability to withstand high torsional forces encountered during the operation of the rotor.

According to yet another embodiment of the present invention, the first impeller comprises a first plurality of blades. The first plurality of blades is circumferentially disposed around the first axial shaft segment. Herewith, it is possible to construct radial compressors using the rotor and the various aforementioned embodiments.

According to an embodiment of the present invention, the rotor comprises a diaphragm, which is located between the first impeller and the second impeller. The coupling means is located in a plane of the diaphragm. This plane is perpendicular to the longitudinal axis. Thus, the coupling means and the diaphragm are located essentially at the same position in longitudinal direction. Herewith, the stability of the coupling is increased, and thereby rendering reliability to the rotor constructed thereof.

According to yet another embodiment of the present invention, the diaphragm is a radially split diaphragm comprising a first diaphragm segment and a second diaphragm segment. The diaphragm segments oppose one another. A plane splitting the diaphragm into the diaphragm segments is perpendicular to the longitudinal axis.

According to yet another embodiment of the present invention, the diaphragm is monolithic.

A diaphragm is a non-moving part between two stages of the multi-stage compressor and normally comprises a diffuser and a return channel. The diaphragm defines a diffuser and a return channel between two adjoining impellers. By using either a split diaphragm or a monolithic diaphragm, especially between the two rotor discs comprising respective impellers, the construction of the radial compressor by a progressive stage-wise assembly of the rotor is simplified.

According to yet another embodiment of the present invention, the first impeller and the first axial shaft segment are made of the same material. This modularizes the rotor discs.

Furthermore, by such a homogenous construction of the rotor disc, it is possible to rapidly prototype the rotor discs. Additionally, it facilitates manufacturing of the rotor discs in a monolithic manner thereby rendering improved stability.

According to yet another embodiment of the present invention, the first rotor disc is obtained by laser sintering.

Herewith, it is possible to obtain customized shapes and profiles of the rotor discs in a simplified manner.

According to yet another embodiment of the present invention, the rotor comprises a casing. The first rotor disc and the second rotor disc are located inside the casing. The casing protects the rotor discs from the external environment as well as contamination. Furthermore, the progressive stage-wise assembly of the rotor inside the casing is simplified. A turbomachine comprising a rotor according to any of the aforementioned embodiments possesses the aforementioned advantages.

According to a method for construction of the rotor, the first rotor is arranged inside the casing of the radial compressor. The first rotor disc is arranged along the longitudinal axis. Subsequently, the diaphragm is arranged inside the casing, such that the diaphragm and the first rotor disc are adjacent to one another along the longitudinal axis. Subsequently, the second rotor disc is arranged inside the casing along the longitudinal axis. The overall arrangement is such that the diaphragm is located between the first rotor disc and the second rotor disc. The first axial shaft segment is coupled to the second axial shaft segment for coupling the first rotor disc to the second rotor disc. The coupling is located in a plane of the diaphragm, wherein the plane is perpendicular to the longitudinal axis. The first rotor disc is fastened to the second rotor disc.

The aforementioned and other embodiments of the invention related to a rotor for a radial compressor and a method for construction of the rotor will now be addressed with reference to the accompanying drawings. The illustrated embodiments are intended to illustrate, but not to limit the invention. The accompanying drawings contain the following figures, in which like numbers refer to like parts, throughout the description and drawings.

BRIEF DESCRIPTION

Some of the embodiments will be described in detail, with reference to the following figures, wherein like designations denote like members, wherein.

DETAILED DESCRIPTION

Figure 1:
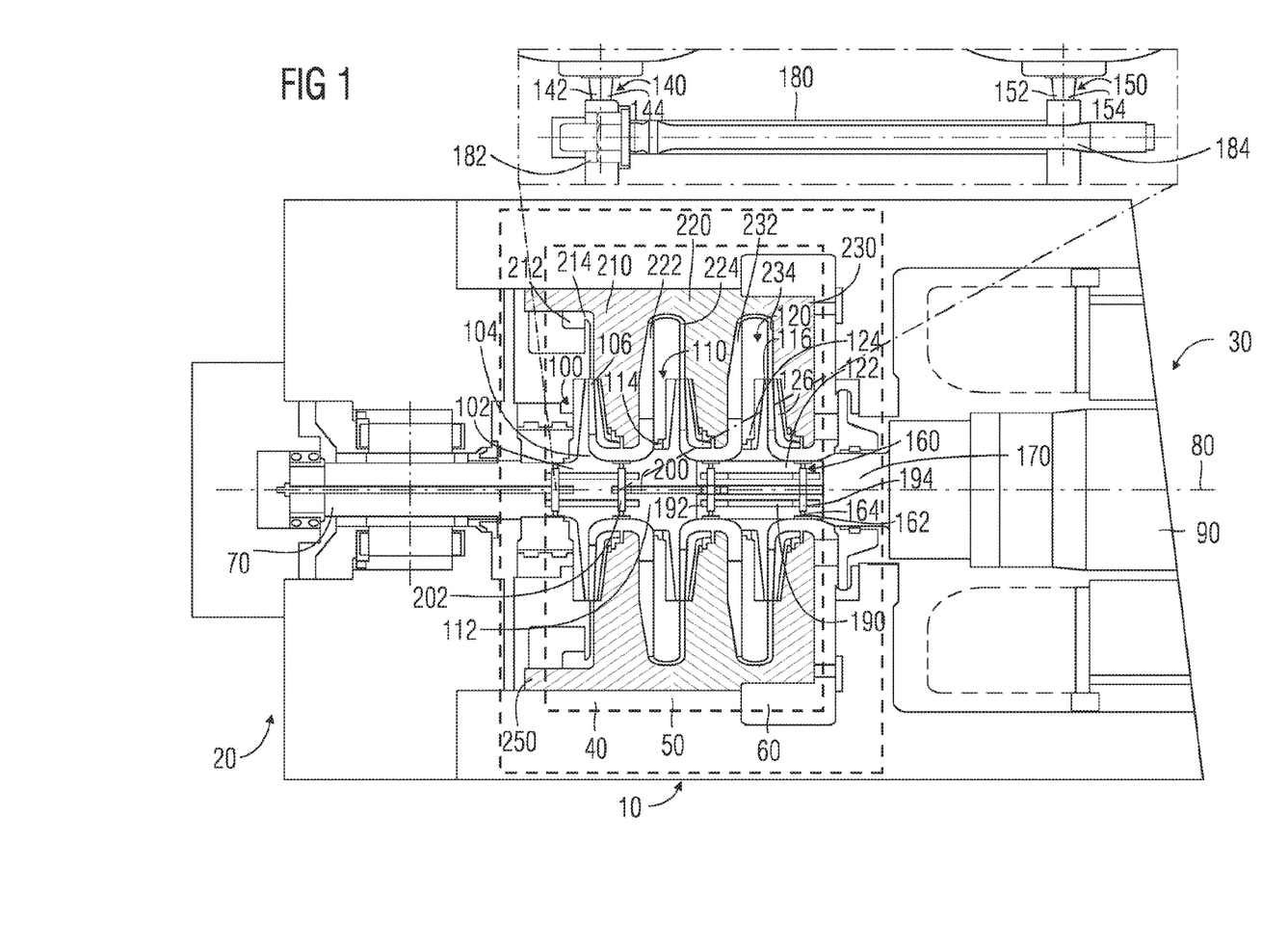
FIG. 1 depicts a technical drawing of a longitudinal cross-sectional view of an embodiment of a three stage radial compressor comprising a first rotor disc and a second rotor disc coupled to one another.

FIG. 1 depicts a technical drawing of a longitudinal cross-sectional view of a radial compressor 10. The radial compressor 10 is an operating part of a turbomachine 20. The radial compressor 10 comprises a rotor 30, which constitutes all the rotating components of the radial compressor 10. The rotor 30 shown in FIG. 1 is a three stage radial compressor and therefore comprises three stages 40, 50, 60 for radially compressing a working fluid.

The rotor 30 comprises an axial shaft 70. The axial shaft 70 extends along a longitudinal axis 80 of the radial compressor 10. The axial shaft 70 is operatively coupled to a motor 90 of the turbomachine 20 for transmitting the torque generated by the rotating motor 90 to the aforementioned three stages 40, 50, 60.

The longitudinal axis 80 is herein an axis of rotation of the radial compressor 10. Furthermore, if any component described herein extends in a longitudinal direction and/or extends longitudinally, it is to be construed that the component extends in a direction along the longitudinal axis 80.

Each of the aforementioned stages 40, 50, 60 comprises respective rotor discs 100, 110, 120. Each of the rotor discs 100, 110, 120 comprises a respective axial shaft segment 102, 112, 122 and a respective impeller 104, 114, 124. Each of the impellers 104, 114, 124 comprises a respective plurality of blades 106, 116, 126 circumferentially disposed around the respective axial shaft segment 102, 112, 122. The impellers 104, 114, 124 increase the pressure and flow of the working fluid.

Each of the axial shaft segments 102, 112, 122 is a longitudinal segment of the axial shaft 70. Each of the axial shaft segments 102, 112, 122 comprises means for operatively coupling the axial shaft segment to components of the adjacent stages 40, 50, 60 of the radial compressor 10 that are located upstream and downstream of the axial shaft segment. For example, for the second axial shaft segment 112, a component for coupling to an adjoining stage 40 located upstream is the first axial shaft segment 102, and a component for coupling to an adjoining stage 60 located downstream is the third axial shaft segment 122.

Herewith, a first stage 40 comprises a first rotor disc 100. The first rotor disc 100 comprises a first axial shaft segment 102 and a first impeller 104 comprising a first plurality of blades 106 circumferentially disposed around the first axial shaft segment 102. Similarly a second stage 50 comprises second rotor disc 110. The second rotor disc 110 comprises a second axial shaft segment 112 and a second impeller 114 comprising a second plurality of blades 116 circumferentially disposed around the second axial shaft segment 114. Similarly, a third stage 60 comprises a third rotor disc 120.

The third rotor disc 120 comprises a third axial shaft segment 122 and a third impeller 124 comprising a third plurality of blades 126 circumferentially disposed around the third axial shaft segment 122.

The aforementioned stages 40,50,60 are located adjacent to one another in a direction along the longitudinal axis 80, i.e., the first stage 40 and the second stage 50 are located adjacent to one another along the longitudinal axis 80, and similarly the second stage 50 and the third stage 60 are located adjacent to one another along the longitudinal axis 80.

The axial shaft 70 of the radial compressor 10 is constituted of the coupled individual axial shaft segments 102, 112,122 of the adjoining rotor discs 100,110,120, wherein the individual axial shaft segments 102,112,122 are coupled to one another in a direction along the longitudinal axis 80. Herein, by coupling the first axial shaft segment 102 with the second axial shaft segment 112, the first rotor disc 100 is coupled to the second rotor disc 110. Similarly, by coupling the second axial shaft segment 112 with the third axial shaft segment 122, the second rotor disc 110 is coupled to the third rotor disc 120. Therewith, the stage-wise progressive construction of the rotor 30 for the radial compressor 10 is accomplished.

A means for coupling any two adjoining axial shaft segments 102,112,122 is such that it permits reversible axial splitting of the axial shaft 70 into the two adjoining axial shaft segments 102,112,122. I.e., the means for coupling permits the joining and the disjoining of adjoining axial shaft segments 102,112,122. The axial shaft 70 is assembled by coupling two adjoining axial shaft segments 102,112,122 in the direction along the longitudinal axis 80. Whereas, the axial shaft 70 is disassembled by decoupling two adjoining axial shaft segments 102,112,122 in the opposite direction along the longitudinal axis 80.

Herewith, by assembling two adjoining axial shaft segments 102,112,122, the adjoining axial shaft segments 102, 112,122 positively engage with one another to achieve the coupling of the respective rotor discs 100,110,120. The positive engagement facilitates the transmission of the torque from the motor 90 to the different stages 40,50,60 without loss of efficiency through the axial shaft 70 constituted of individual axial shaft segments 102,112,122.

A first coupling means 140 operatively couples the first axial shaft segment 102 to the second axial shaft segment 112 in the direction along the longitudinal axis 80. Therewith, the coupling of the first rotor disc 100 to the second rotor disc 110 is achieved. Similarly, a second coupling means 150 operatively couples the second axial shaft segment 112 to the third axial shaft segment 122 in the direction along the longitudinal axis 80. Therewith, the coupling of the second rotor disc 110 to the third rotor disc 120 is achieved. A third coupling means 160 couples the third axial shaft segment 122 to the motor 90. Therewith, the coupling of the third rotor disc 120 to the motor 90 is achieved. Thus, the motor 90 is operatively coupled to the axial shaft 70, which itself is formed by integrating the individual axial shaft segments 102,112,122.

Herewith, the various coupling means 140,150,160 facilitates the assembly of the axial shaft 70 from the individual axial shaft segments 102,112,122. Consequentially, the assembly of the rotor 30 of the radial compressor 10 from the individual rotor discs 100,110,120 is facilitated.

The first coupling means 140 is a first Hirth joint according to an embodiment described herein. The first Hirth joint 140 comprises a first set of longitudinally extending serrations 142 provided on the first axial shaft segment 102 and a second set of longitudinally extending serrations 144 provided on the second axial shaft segment 112. The first set and the second set of longitudinally extending serrations 142,144 mesh with one another. Therewith, a positive engagement is achieved between the first axial shaft segment 102 and the second axial shaft segment 112 for coupling the first rotor disc 100 to the second rotor disc 110.

Furthermore, the second coupling means 150 can be a second firth joint and the third coupling means 160 can be a third Hirth joint, the second and third Hirth joints comprising the respective sets of longitudinally extending serrations as described for the first coupling means 140. The second Hirth joint 150 comprises a third set of longitudinally extending serrations 152 provided on the second axial shaft segment 112 and a fourth set of longitudinally extending serrations 154 provided on the third axial shaft segment 122. The third set and the fourth set of longitudinally extending serrations 152,151 mesh with one another for achieving a positive engagement between the second axial shaft segment 112 and the third axial shaft segment 122 for coupling the second rotor disc 110) to the third rotor disc 110.

Similarly, the third Hirth joint 160 comprises a fifth set of longitudinally extending serrations 162 provided on the third axial shaft segment 122 and a sixth set of longitudinally extending serrations 164 provided on a shaft segment 170 of the motor 90. The fifth set and the sixth set of longitudinally extending serrations 162,164 mesh with one another for achieving a positive engagement between the third axial shaft segment 122 and the motor 90 for coupling the third rotor disc 120 to the motor 90.

The Hirth joints 140,150,160 achieve the positive engagement of the respective axial shaft segments 102,112,122. The Hirth joints 140,150,160 obviate radial protrusions provided on two axial shaft segments to achieve coupling the two axial shaft segments to one another when compared to a flange based coupling.

Each of the Hirth joint 140,150,160 further comprises a means 180,190 for fastening in order to tighten the coupling of the respective axial shaft segments 102,112,122. The means 180,190 for fastening is one or more tie bolts in accordance with an embodiment. Each tie bolt 180 extends in the direction along the longitudinal axis 80. The tie bolt 180 is inserted through designated holes 182 provided in the rotor discs 100,110 to be coupled. The tie bolt is then tightened to fasten the respective axial shaft segments 102, 112,122, which in turn couples the rotor discs to one another.

The first Hirth joint 140 comprises a first set of tie bolts 180, which fastens the first rotor disc 100 to the second rotor disc 110. Each of the first set of tie bolts 180 is inserted through a corresponding first set of holes 182 provided in the first axial shaft segment 102 of the first rotor disc 100, and subsequently through a corresponding second set of holes 184 provided in the second axial shaft segment 112 of the second rotor disc 110. Each of the first set of holes 182 extends in the longitudinal direction and is proximal to the first set of longitudinally extending serrations 142. Similarly, each of the second set of holes 184 extends in the longitudinal direction and is proximal to the second set of longitudinally extending serrations 14. The first set of tie bolts 180 is then tightened to fasten the coupling of the first rotor disc 100 to the second rotor disc 110, which renders the coupling tight. Similarly, the second Hirth joint 150 comprises a second set of tie bolts 190, which fastens the second rotor disc 110 to the third rotor disc 120. The second set of tie bolts 190 is inserted through a corresponding third set of holes 192 provided in the second rotor disc 110, and subsequently through a corresponding fourth set of holes 194 provided in the third rotor disc 120. Each of the third set of holes 192 extends in the longitudinal direction and is proximal to the third set of longitudinally extending serrations 152.

Similarly, each of the fourth set of holes 194 extends in the longitudinal direction and is proximal to the fourth set of longitudinally extending serrations 154. The second set of tie bolts 190 is then tightened to fasten the coupling of the second rotor disc 110 to the third rotor disc 120, which renders the coupling tight.

Furthermore, a third set of tie bolts 200 are provided to fasten the first rotor disc 100 to the third rotor disc 120. This is achieved by inserting each of the third set of tie bolts 200 through a hole provided in the first rotor disc 100, and subsequently through another hole provided in the third rotor disc 120. The third set of tie bolts 200 is provided as additional means to increase the coupling between the various rotor discs 100,110,120. Each of the third set of tie bolts 200 is then tightened to render further strength and stability to the axial shaft 70.

The radial compressor 10 comprises a diaphragm located between two adjacent impellers. The diaphragm is located such that the means for coupling the respective adjacent axial shaft segments is located in a plane of the diaphragm, wherein the diaphragm itself is perpendicular to the longitudinal axis. The plane extends radially, and the normal vector of the plane is parallel to the longitudinal axis.

The diaphragm defines a diffuser and a return channel between any two of the adjacent impellers. The diffuser converts the velocity energy of the working fluid into pressure energy for increasing the pressure of the compressed working fluid.

Whereas, the return channel changes the direction of the flow such that the working fluid enters the adjoining impeller located downstream for compressing the working fluid. According to an exemplary embodiment of the present invention, the diaphragm is monolithic, i.e. the diaphragm does not comprise a split plane. The monolithic diaphragm may be obtained by casting, laser sintering, electrical discharge machining, et cetera.

According to another embodiment of the present invention, the diaphragm is radially split, thereby comprising a first diaphragm segment and a second diaphragm segment. The diaphragm segments oppose one another. Herein, a plane, which splits the diaphragm into the aforementioned diaphragm segments, extends radially. The normal vector of this plane is perpendicular to the longitudinal axis 80.

Herein a first diaphragm 210, which is located between the first impeller 104 and the second impeller 114, defines a first diffuser 212 and a first return channel 214 between the first impeller 104 and the second impeller 114. Similarly, a second diaphragm 220, which is located between the second impeller 114 and the third impeller 124, defines a second diffuser 222 and a second return channel 224 between the second impeller 114 and the third impeller 124. The working fluid is sucked into the radial compressor 10 by the first plurality of blades 106 of the first impeller 104 and is directed radially outwards towards the first diffuser 212 and then to the first return channel 214. The flow direction of the working fluid is changed to radially inwards thereon by the first return channel 214. Thereafter, the working fluid is sucked into by the second plurality of blades 116 to enter into the second impeller 114, which directs the working fluid radially outwards towards the second diffuser 222 and then to the second return channel 224. The flow direction of the working fluid is then changed to radially inwards thereon by the second return channel 224 and thereafter the working fluid enters the successive downstream stages.

The radial compressor 10 depicted herein is provided with a casing 250 and the three stages 40,50,60 are located inside the casing 250. The stages 40,50,60 are assembled in a progressive stage-wise manner inside the casing 250. The casing 250 is a monolithic cylindrical casing and protects the rotor discs 40,50,60 of the radial compressor 10 from the external environment and contamination.

Figure 2:
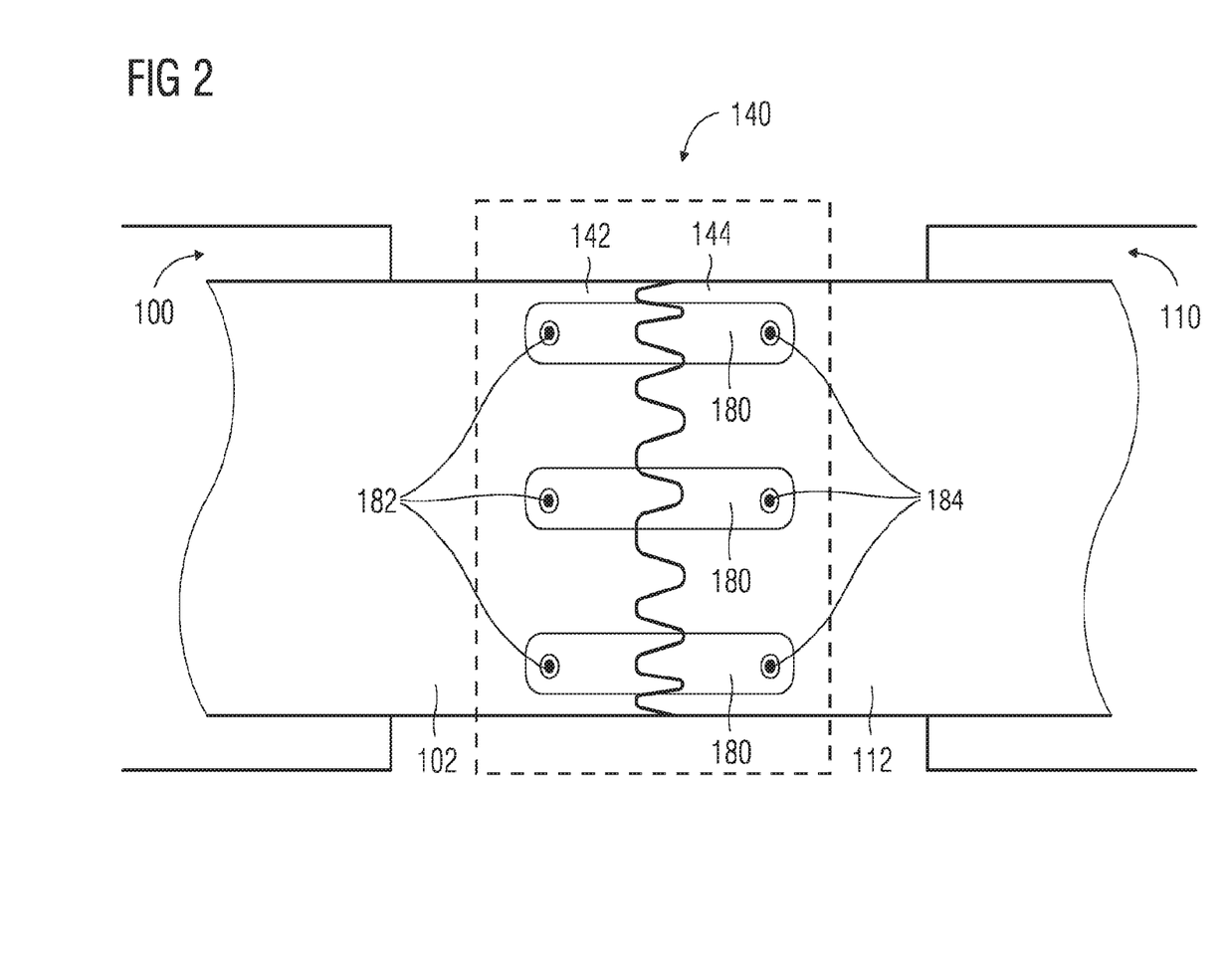
FIG. 2 depicts an embodiment of the coupling of the first rotor disc and the second rotor disc referred to in FIG. 1 by means of a Hirth joint and fastened by tie bolts.

FIG. 2 depicts the first rotor disc 100 coupled to the second rotor disc 110 by means of the first Hirth joint 140.

The first Hirth joint 110 comprises the first set of longitudinally extending serrations 142 provided in the first axial shaft segment 102 and the second set of longitudinally extending serrations 144 provided in the second axial shaft segment 112. The first and second sets of longitudinally extending serrations 142,144 oppose one another in the longitudinal direction. The sets of longitudinally extending serrations 142,144 mesh with one another to form a positive engagement. The coupling between the first and the second rotor discs 100,110 is fastened by the first set of tie bolts 180. Thus, the positive engagement resulting from the first Hirth joint 140 along with the fastening provided by the first set of tie bolts 180 combine to render a tight coupling. The tight coupling facilitates the efficient transmission of the torque along the entire axial shaft 70 and obviates disturbances and vibrations arising in the axial shaft 70.

The coupling effect achieved by the first Hirth joint 110 is identical to the coupling effect achieved by the second Hirth joint 150 for coupling the second rotor disc 110 to the third rotor disc, as well as the third Hirth joint 160 for coupling the third rotor disc 120 with the motor 90. Similarly, the fastening effect achieved by the first set of tie bolts 180 is identical to the fastening effect achieved by the second set of tie bolts 190 for fastening the second rotor disc 110 with the third rotor disc 120, as well as the third set of tie bolts 200 for fastening the first rotor disc 100 with the third rotor disc 120.

Figure 3:
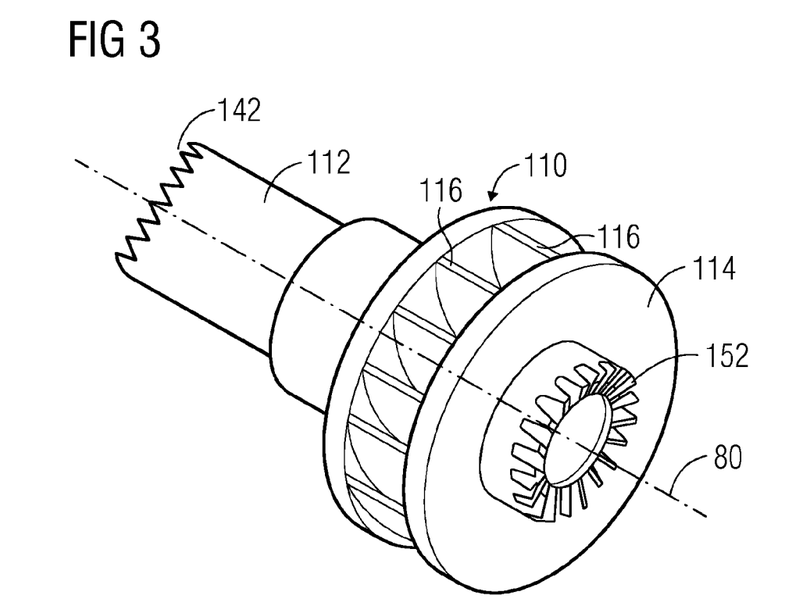
FIG. 3 depicts a perspective view of an embodiment of the second rotor disc referred to in FIG. 1, wherein the second rotor disc comprises an axial shaft segment, an impeller comprising a plurality of blades, and sets of longitudinally extending serrations for forming the Hirth joint.

FIG. 3 depicts an exemplary perspective view of the second rotor disc 110 for the radial compressor 10.

The second rotor disc 110 comprises the second axial shaft segment 112 and the second impeller 11. The second plurality of blades 116 of the second impeller 114 is disposed circumferentially around the second axial shaft segment 112. Furthermore, the second rotor disc 110 comprises the second set of longitudinally extending serrations 144 provided in one end (Ei) of the second axial shaft segment 112, and comprises the third set of longitudinally extending serrations 152 on the other end ($E_2$) of the second axial shaft segment 112. The two ends (Ei and $E_2$) are longitudinally opposite to one another. The second set of longitudinally extending serrations 144 enable the coupling of the second axial shaft segment 112 with the first axial shaft segment 102 for forming the first Hirth joint 140 in the longitudinal direction. Whereas, the third set of longitudinally extending serrations 152 enable the coupling of the second axial shaft segment 112 with the third axial shaft segment 122 for forming the second Hirth joint 150 in the longitudinal direction. Thus, the second and the third sets of longitudinally extending serrations 144,152 enable the formation of the axial shaft 70 as well as the progressive stage-wise assembly of the radial compressor 10.

Figure 4:
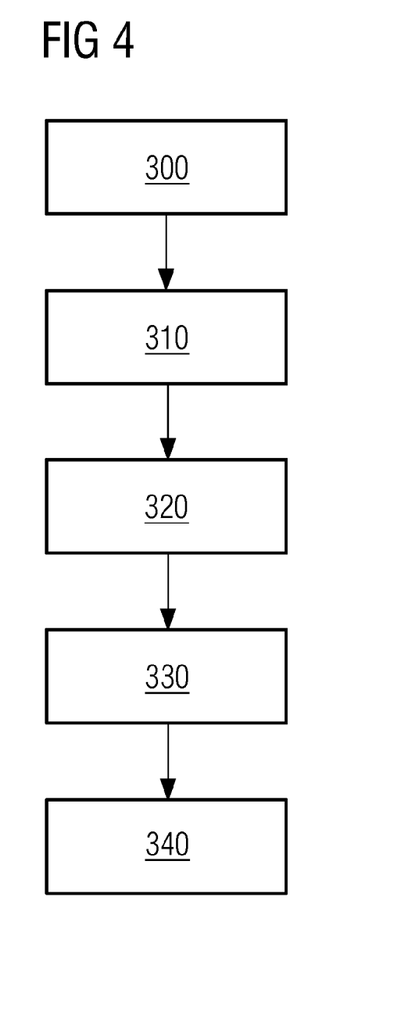
FIG. 4 depicts a flowchart of an embodiment of a method for construction of the rotor for the radial compressor referred to in FIG. 1.

For any of the aforementioned rotor discs 100,110,120, the respective impeller 104,114,124 and the respective axial shaft segment 102,112,122 of the rotor disc 100,110,120 are bath made of the same material according to an embodiment disclosed herein. Thus, the rotor disc 100,110,120 is capable of being monolithically manufactured, which modularizes the rotor disc 100,110,120. This provides improved stability to the rotor disc 100,110,120. Furthermore, the rotor disc 100,110,120 is obtained by laser sintering according to another embodiment, which facilitates the construction of even complex shapes of the rotor discs 100,110,120 including the means for operatively coupling the rotor discs 100, 110, 120. FIG. 4 depicts a flowchart of a method for construction of the rotor 30 for the radial compressor 10.

In step 300, the first rotor disc 100 is arranged inside the casing 250. The arrangement is such that the first rotor disc 100 is placed along the longitudinal axis 80. In a subsequent step 310, the first diaphragm 210 is arranged inside the casing 250, such that the first diaphragm 210 is located adjacent to the first rotor disc 100. The first rotor disc 100 and the first diaphragm 210 are located along the longitudinal axis 80, wherein the first diaphragm 210 is located upstream to the first rotor disc 100.

In step 320, the second rotor disc 110 is arranged inside the casing 250. The arrangement is such that the second rotor disc 110 is located upstream to the first diaphragm 210 along the longitudinal axis 80. Thus, the first diaphragm 210 is located in between the first rotor disc 100 and the second rotor disc 110. Thus, the first diaphragm 210 defines the first diffuser 212 and the first return channel 214 for the working fluid, as the working fluid transits from the first impeller 104 of the first rotor disc 100 to the second impeller 114 of the second rotor disc 110.

In step 330, the first axial shaft segment 102 of the first rotor disc 100 is coupled to the second axial shaft segment 112 of the second rotor disc 110 by the first coupling means 140. The first coupling means 140 is located in the aforementioned plane of the first diaphragm 210. Thus, the first rotor disc 100 is coupled to the second rotor disc 110 in the longitudinal direction. In a subsequent step 340, the first rotor disc 100 is fastened to the second rotor disc 110 by the first fastening means 180. Thus, the coupling between the first rotor disc 100 and the second rotor disc 110 is rendered tight by the first fastening means 180.

Herein, the aforementioned steps can be repeated for arranging the second diaphragm 220 and the third rotor disc 120 inside the casing 250, and along the longitudinal axis 80. The arrangement is such that the second diaphragm 220 and the third rotor disc 120 are upstream to the second rotor disc 110. Furthermore, the second diaphragm 220 is located in between the second rotor disc 110 and the third rotor disc 120. Thus, the second diaphragm 220 defines the second diffuser 222 and the second return channel 224 for the working fluid, as the working fluid transits from the second impeller 114 of the second rotor disc 110 to the third impeller 124 of the third rotor disc 120.

Herein, the second coupling means 150 couples the second rotor disc 110 to the third rotor disc 120. The second fastening means 190 fastens the second rotor disc 110 to the third rotor disc 120, thereby tightening the second coupling means 150.

Thus, the rotor discs 100,110,120 and the respective diaphragms 210,220 are arranged in a stage by stage manner inside the casing 250 of the radial compressor 10, thereby facilitating the stage wise assembly and construction of the radial compressor 10. Though the invention has been described with reference to specific embodiments, this description is not meant to be construed in a limiting sense. Various examples of the disclosed embodiments, as well as alternate embodiments of the invention, will become apparent to persons skilled in the art upon reference to the description of the invention. It is therefore contemplated that such modifications can be made without departing from the embodiments of the present invention as defined.

The invention claimed is:

1. A rotor for a radial compressor comprising:
    an axial shaft, the axial shaft comprising at least a first axial shaft segment, a second axial shaft segment, and a third axial shaft segment; and
    the rotor extending in a longitudinal direction along a longitudinal axis of the radial compressor, the rotor comprising:
        a first rotor disc comprising the first axial shaft segment and a first impeller, and
        a second rotor disc comprising the second axial shaft segment and a second impeller, and
        a third rotor disc comprising the third axial shaft segment and a third impeller;
    wherein the first axial shall segment, the second axial shaft, segment, and the third axial shall segment are longitudinal segments of the axial shaft of the rotor,
    wherein the first rotor disc, the second rotor disc, and the third rotor disc are adjacent to one another in the longitudinal direction,
    wherein the rotor is provided with a coupling means for coupling the first rotor disc to the second rotor disc and the second rotor disc to the third rotor disc, the coupling means permits reversible axial splitting of the axial shaft into the first axial shaft segment and the second axial shaft segment;
    wherein the coupling means further comprises a first fastening means for fastening the first rotor disc to the second rotor disc, the first fastening means comprising:
        a first set of tie bolts, the first set of tie bolts being inserted through a first hole provided in the first rotor disc and through a second hole provided in the second rotor disc, respectively, such that when the first set of tie bolts is tightened, the first set of tie bolts fasten the first rotor disc only to the second rotor disc of the rotor;
    wherein the coupling means further comprises a second fastening means for fastening the second rotor disc to the third rotor disc, the second fastening means comprising:
        a second set of tie bolts, the second set of tie bolts being inserted through a first hole provided in the second rotor disc and through a second hole provided in the third rotor disc, respectively, such that when the second set of tie bolts is tightened, the second set of tie bolts fasten the second rotor disc only to the third rotor disc of the rotor;
    wherein the coupling means tightens a coupling of the first axial segment, the second axial segment, and the third axial segment.

2. The rotor according to claim 1, wherein the coupling means is a Hirth joint.

3. The rotor according to claim 2, wherein the Hirth joint comprises:
    a first set of longitudinally extending serrations provided on the first axial shaft segment, and
    a second set of longitudinally extending serrations provided on the second axial shaft segment,
    wherein the first set of longitudinally extending serrations and the second set of longitudinally extending serrations are dimensioned to positively engage with one another for coupling the first rotor disc to the second rotor disc.

4. The rotor according to claim 1, wherein the first impeller comprises a first plurality of blades, and wherein the first plurality of blades is circumferentially disposed around the first axial shaft segment.

5. The rotor according to claim 1, wherein the rotor comprises a diaphragm located between the first impeller and the second impeller, wherein the diaphragm defines a diffuser and a return channel between the first impeller and the second impeller, and wherein the coupling means is located in a plane of the diaphragm, wherein the plane is perpendicular to the longitudinal axis.

6. The rotor according to claim 5, wherein the diaphragm is monolithic.

7. The rotor according to claim 1, wherein the first impeller and the first axial shaft segment are made of the same material.

8. The rotor according to claim 1, wherein the first rotor disc is obtained by laser sintering.

9. The rotor according to claim 1, further comprising a casing, wherein the first rotor disc and the second rotor disc are located inside the casing.

10. A turbomachine comprising the rotor according to claim 1.

11. A method for construction of a rotor for a radial compressor comprising an axial shaft, wherein the axial shaft comprises at least a first axial shaft segment, a second axial shaft segment, and a third axial shaft segment, and the rotor extends in a longitudinal direction along a longitudinal axis of the radial compressor, the method comprising:
- arranging a first rotor disc inside a casing of the radial compressor, such that the first rotor disc is along the longitudinal axis;
- arranging a first diaphragm inside the casing, such that the first diaphragm is adjacent to the first impeller along the longitudinal axis;
- arranging a second rotor disc inside the casing along the longitudinal axis, such that the first diaphragm is located between the first rotor disc and the second rotor disc;
- coupling the first axial shaft segment to the second axial shaft segment for coupling the first rotor disc to the second rotor disc, such that the coupling of the first rotor disc to the second rotor disc is located in a plane of the diaphragm, wherein the plane is perpendicular to the longitudinal axis;
- arranging a second diaphragm inside the casing, such that the second diaphragm is adjacent to the second impeller along the longitudinal axis;
- arranging a third rotor disc inside the casing along the longitudinal axis, such that the second diaphragm is located between the second rotor disc and the third rotor disc;
- coupling the second axial shaft segment to the third axial shaft segment for coupling the second rotor disc to the third rotor disc, such that the coupling of the second rotor disc to the third rotor disc is located in a plane of the second diaphragm, wherein the plane is perpendicular to the longitudinal axis;
- providing a first set of tie bolts for a fastening means;
- inserting the first set of tie bolts through a first hole provided in the first rotor disc and through a second hole provided in the second rotor disc;
- tightening the first set of tie bolts such that the first rotor disc is fastened only to the second rotor disc of the rotor;
- providing a second set of tie bolts for the fastening means;
- inserting the second set of tie bolts through a first hole provided in the second rotor disc and through a second hole provided in the third rotor disc;
- tightening the second set of tie bolts such that the second rotor disc is fastened only to the third rotor disc of the rotor;
- tightening a coupling of the first axial segment, the second axial segment, and the third axial segment.

12. The method according to claim 11, further comprising a step of fastening the first rotor disc to the second rotor disc.

* * * * *

UNITED STATES PATENT AND TRADEMARK OFFICE
CERTIFICATE OF CORRECTION

PATENT NO. : 10,202,851 B2
APPLICATION NO. : 14/410124
DATED : February 12, 2019
INVENTOR(S) : Jan Slotman It is certified that error appears in the above-identified patent and that said Letters Patent is hereby corrected as shown below:

In the Claims

Column 10, Line 17, delete "shall" and insert -- shaft --

Column 10, Line 18, delete "shaft, segment," and insert -- shaft segment, --

Column 10, Line 18, delete "axial shall segment" and insert -- axial shaft segment --

Signed and Sealed this
Twenty-seventh Day of August, 2019

Andrei Iancu
*Director of the United States Patent and Trademark Office*